United States Patent [19]

Regna et al.

[11] Patent Number: 5,775,357
[45] Date of Patent: Jul. 7, 1998

[54] FUEL FILL VALVE AND VENT VALVE ASSEMBLY

[75] Inventors: Peter J. Regna, Tuxedo Park; Albert S. Baris, Suffern, both of N.Y.

[73] Assignee: Aero Tec Laboratories, Ramsey, N.J.

[21] Appl. No.: 802,727

[22] Filed: Feb. 20, 1997

[51] Int. Cl.$^6$ .............................. F16K 24/04; F16K 15/14
[52] U.S. Cl. .................. 137/43; 137/527.6; 137/587; 137/588; 137/855; 220/86.2
[58] Field of Search ..................... 137/527.6, 855, 137/43, 587, 588; 220/86.2

[56] References Cited

U.S. PATENT DOCUMENTS

| | | | |
|---|---|---|---|
| 2,378,613 | 6/1945 | Young et al. | 137/855 |
| 2,899,981 | 8/1959 | Binks | 137/855 |
| 3,911,949 | 10/1975 | Hilden et al. | |
| 4,022,245 | 5/1977 | Davis | 137/855 X |
| 4,619,436 | 10/1986 | Bonzer et al. | 251/61.1 |
| 5,282,497 | 2/1994 | Allison | 137/588 X |
| 5,327,933 | 7/1994 | Ishikawa et al. | 137/527.6 |
| 5,355,910 | 10/1994 | Gies et al. | 137/855 X |

OTHER PUBLICATIONS

Brochure—Assembly Instructions ATL Saver Cell® Racing Fuel Cell Tank, dated Dec. 1993.
Catalog—ATL Racing Fuel Cells, dated Dec. 1993.

Primary Examiner—Gerald A. Michalsky
Attorney, Agent, or Firm—W. Squire

[57] ABSTRACT

A composite relatively flexible resilient flap member has a movable flap and is formed of composite reinforcing fibers such as nylon, carbon or polyester impregnated with elastomeric flexible fuel resistant material. A rigid sheet member formed of composite material comprising reinforcing fibers such as glass, carbon, polyester and nylon and epoxy stiffens the flap. The flap overlies a fuel fill opening in a support plate with a major portion of the flap member fixedly overlying the plate. The flap is offset in an opening of a mounting plate secured to the support plate. The stiffened flap member is preformed with a bend to form a resilient biased hinge when flattened, the hinge being spaced from the fuel fill opening. The flap member and rigid member have low inertia to assist in rapid closure. Other embodiments are disclosed. A fuel cell tank breather vent has a tube with a male valve slug having an elongated shank. The slug length and weight and spring constant of a valve closure spring have values such that the spring is normally compressed by the slug to the valve open state when the vent tube is vertical. When horizontal, the spring immediately closes the slug-O-ring valve.

23 Claims, 3 Drawing Sheets

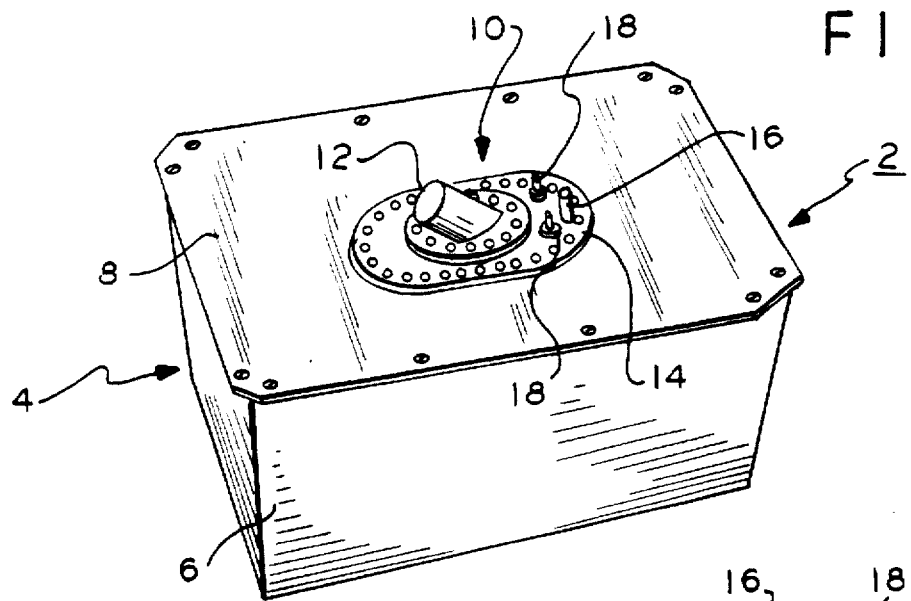
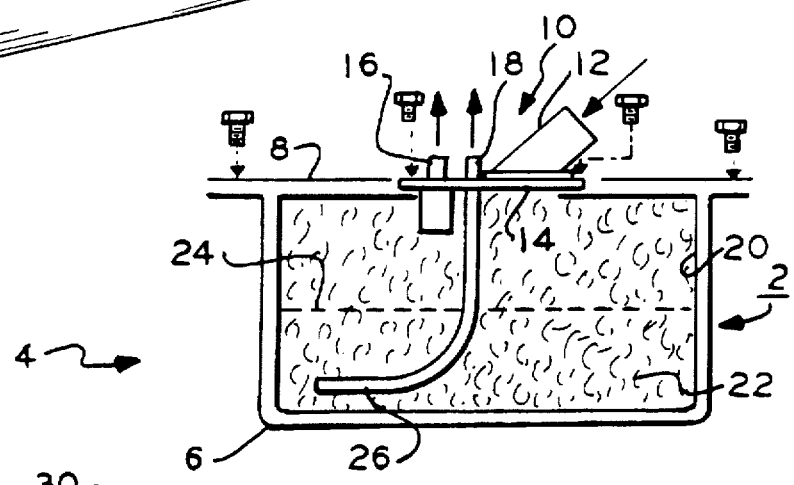
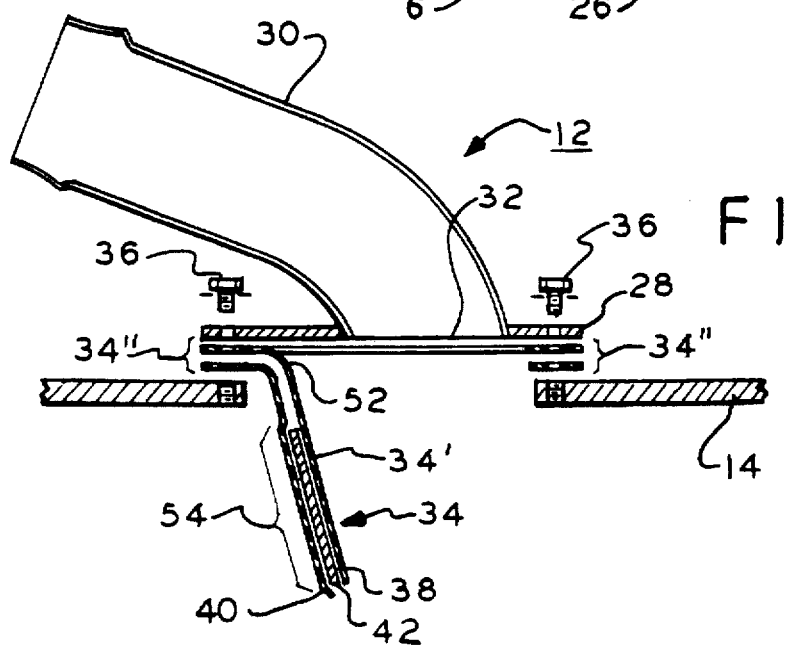

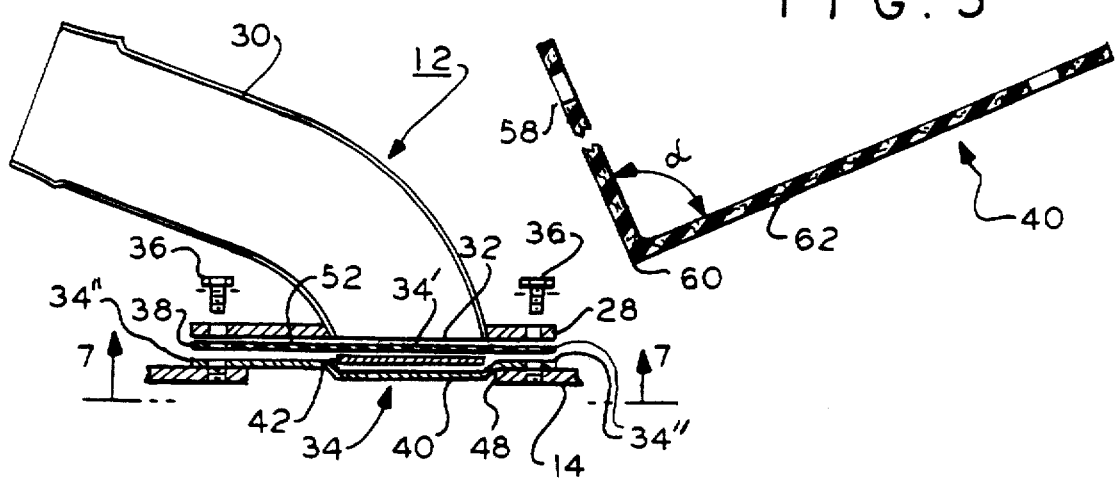
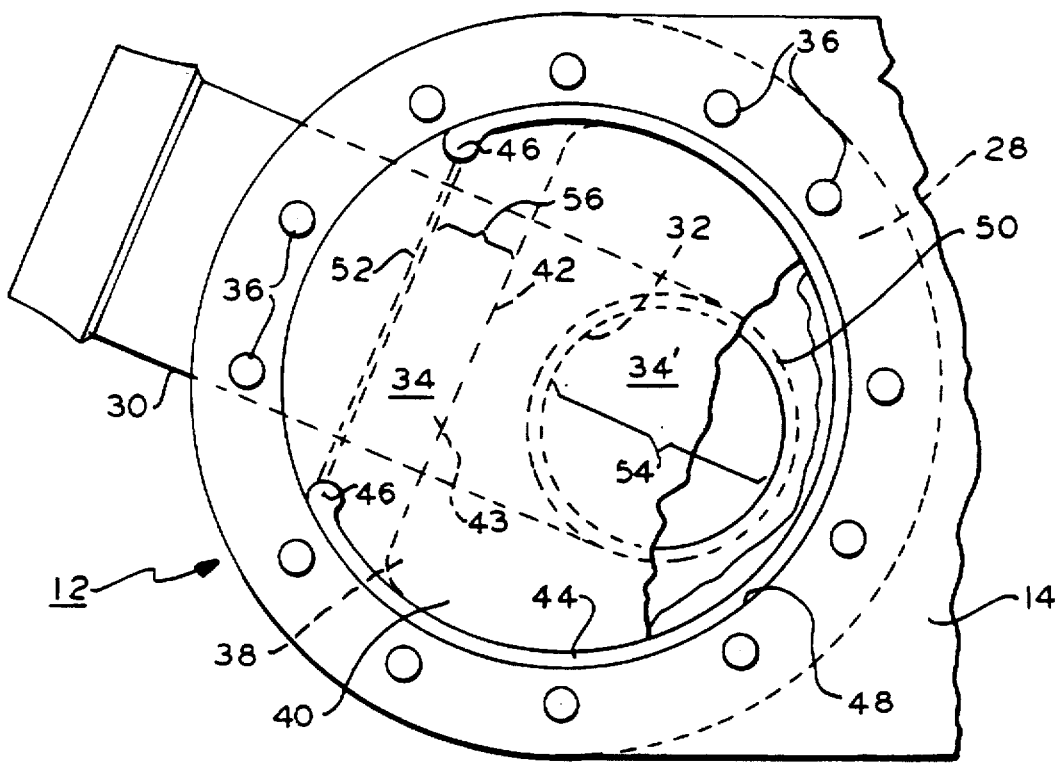

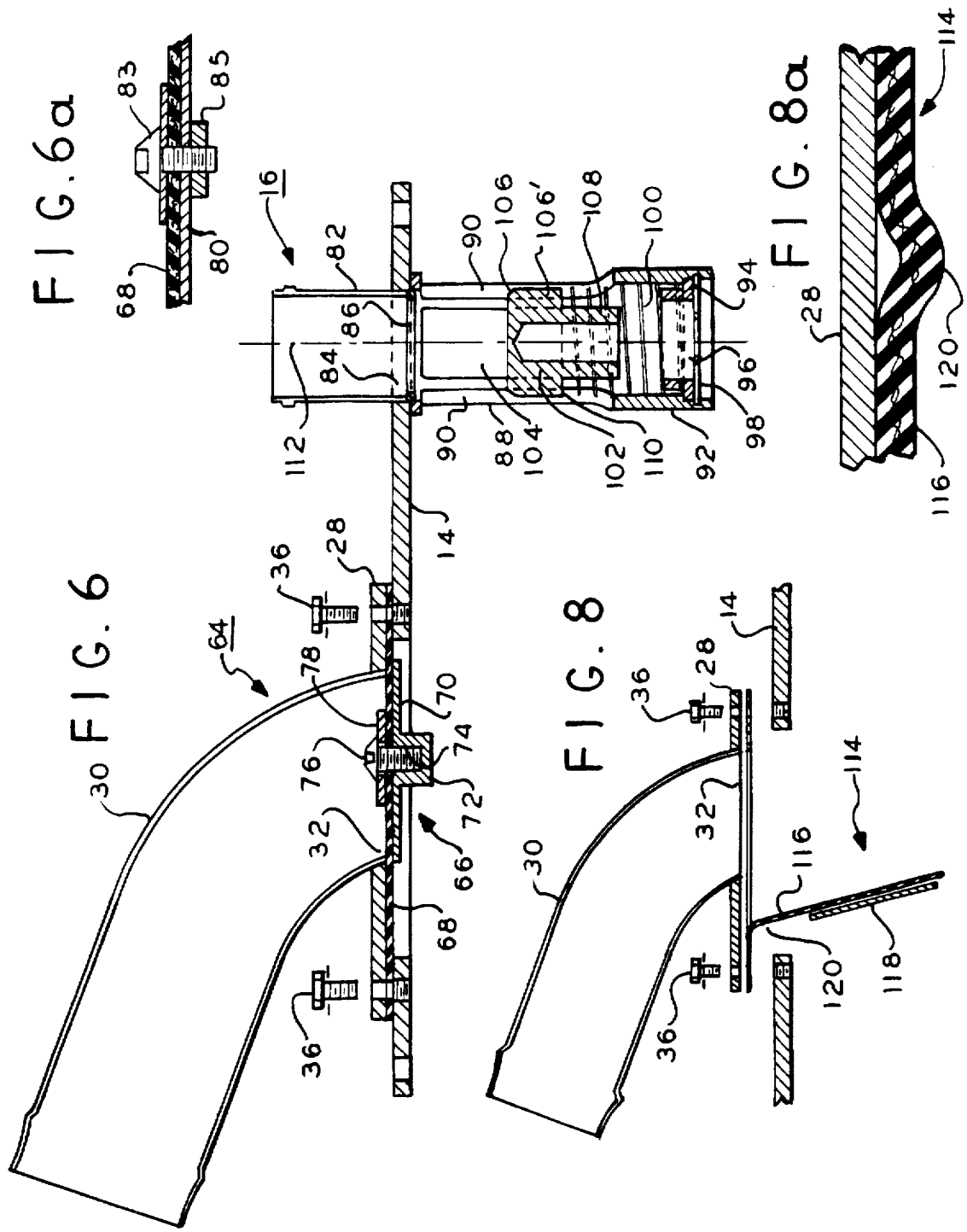

FUEL FILL VALVE AND VENT VALVE ASSEMBLY

This invention relates to fuel fill valves and vent valves for use in refueling fuel cells employed in racing cars to minimize fuel leakage and resulting fire in the event of vehicle overturn or damage to the cell in a serious accident.

A fuel cell comprises an outer metal fuel tank, a puncture resistant bladder liner in the tank and explosion suppressing foam baffling installed in the interior of the bladder. These cells are crash resistant and non-exploding for use in race cars, rally cars and off the road vehicles among others. In conjunction with making the cells crash resistant, automatic valves are provided for the fuel intake pipe and the breather vent port in case a vehicle rolls over in an accident and the fuel fill cap is severed.

Fuel fill valves, also known as roll-over valves, must offer minimum f low resistance and provide maximum flow rate for fast "pit stop" refueling during a race. These valves must also be able to seal tightly and prevent the release of fuel which could cause a fire in a crash where the fuel cell tank is damaged or the vehicle rolls over. Roll over check valves for the fill pipe are available in two configurations, "A" and "B" type assemblies. The "A" type permits rapid refueling, but does not seal quickly or adequately in a crash. The "B" type seals well, but stifles fuel flow and undesirably prolongs pit-stop refueling time which in a race is critical.

Many high speed racing accidents have resulted in tragic fuel fires, not because the fuel cell was penetrated, but because the fill and vent lines were breached on a fuel cell employing an "A" type valve assembly. Conversely, many important races (and their prize money) were lost because the safer "B" type valve assembly restricted refueling rates and prolonged "pit-stop" time. Since racers race to win, they nearly always choose the less safe "A" type valve assemblies.

The "A" type valve assembly is typically a normally open ball check valve in which a ball in a tube is generally free to roll toward the valve seat when the vehicle rolls over. The problem with this valve is that it is not reliable. The tube in which the ball is situated has axially extending slots for the fuel to exit from the tube into the tank bladder. However, the bladder is also filled with open cell foam. This foam has cells with no cell walls and permits fuel to fill and be drawn therefrom readily. The entire tank volume is filled with this foam. In the case of a crash, the tank and bladder may be crushed forcing the foam into the tube slots and blocking the path of the ball before it can close the valve. Also, if the tube is damaged before the ball seats closed, the ball may not close the valve at all. Also, this type of valve does not always close in case of a rollover where the vehicle is on its side and the tank is oriented at right angles from its normal upright position. The ball may not adequately respond to such rollovers and the tank may spill fuel out of the fuel fill pipe.

Vent valves are valves used for venting the fuel cell tank during fuel filling. These valves are of similar construction as the fuel fill ball valves, but smaller in size. They suffer from the same disadvantages. If not closed in case of a crash or rollover accident, the fuel can leak from the vent opening.

The "B" type valve does not use a ball type check valve arrangement. This type uses a normally closed elastomeric fuel resistant sheet material flap type valve member. In this configuration, a spider spoke member crosses the fuel fill opening in the tank. A rubber or elastomeric flexible fuel resistant sheet material available under the trade mark Viton is fastened with a screw in the center of the fuel fill opening to the spider spoke arrangement. The flap valve member engages the edges of the opening in a sealing engagement due to resilient flap memory in the normally closed position. That is, the flap member is bent in response to the force of the incoming fuel flow. When the flow stops, the flap automatically returns to its normal quiescent position sealed against the mating valve seat due to natural inherent resiliency.

The center position of the spoke fastener and the spokes supporting the flap reduce the size of the fill opening. More importantly, the elastomeric flap member being secured centrally to the spider in the opening, does not permit the fuel inlet opening to be fully opened. This is because a portion of the flap member adjacent to the fastening screw in the center of the fuel inlet opening has limited motion to open because of its close proximity to the fastening location. The flap must bend outwardly into the tank volume from the screw. The bend portion adjacent to the screw can not bend at right angles to fully clear the opening. As a result, fuel flow is severely restricted by the limited opening size which is considerably reduced by the flap member.

The present inventors recognize a need for improved fuel fill and vent valving arrangements which permit rapid filling of the fuel cell tank while maximizing safety by precluding leakage in case of tank damage or rollover in a crash.

A valve assembly for a liquid fuel container according to the present invention comprises a base plate having opposing sides and an opening for passing received fuel therethrough, the plate having a circumferential region surrounding the opening. A resilient flexible fuel impervious flap valve member comprises a proximal portion fixedly attached in overlying relation to one side of the base plate spaced from the opening and a movable distal portion overlying the opening and the plate circumferential region on the one plate side for resilient sealing engagement with the plate in a valve closed position. The flap valve member is hinged between the distal and proximal portions overlying the plate. The distal and proximal portions are resiliently biased hinged to each other and overly the plate for resiliently biasing the distal portion in the closed position such that the distal portion displaces away from the opening and the plate region to a valve open position in response to incidence of the received fuel thereon.

In a further embodiment, a container mounting plate is included for attachment to the container and has a vent opening including a female valve seat, the mounting plate having a further opening, the base plate being attached to the mounting plate with the proximal portion between the mounting and base plates, the flap valve member being located in the further opening. A tubular member is provided having a vent gas receiving opening, the tubular member defining an axis, the tubular member axially depending from the mounting plate about the vent opening with an axially extending hollow core in communication with the vent opening. A male valve member is slidably engaged with the tubular member in the core and has an annular male valve seat for engaging the female valve seat in a vent closed position, the male member being axially displaceable from the closed position to an open position, the male member including a cylindrical weight portion for providing a predetermined weight value to the valve member. Second bias means are secured to the tubular member and continuously engaged with the male valve member in the core for biasing the male valve member in a direction toward the closed valve position, the male member weight value and the bias value cooperating such that the vent opening is normally open when the axis is vertical, the bias means bias value and weight value having values so that the male member displaces to the closed valve state when the axis is rotated to at least about horizontal.

A fuel fill valve for a liquid fuel container fill opening according to a further embodiment of the present invention comprises a base plate for attachment to the fuel container, the plate having opposing sides and an opening for passing received fuel therethrough, the plate having a circumferential region surrounding the opening. A resilient flexible fuel impervious valve flap member comprises a proximal portion fixedly attached in overlying relation to one side of the plate spaced from the opening and a distal movable portion overlying the opening and the plate circumferential region on one plate side for resilient sealing engagement with the plate in a valve closed position. The valve flap member is hinged between the distal and proximal portions with the hinge overlying the plate. Bias means bias the distal portion in the closed position such that the distal portion displaces away from the opening and the plate region to a valve open position in response to the received fuel.

In a further embodiment, the distal and proximal portions and hinge comprise a one piece integral flap member of a fuel impervious elastomeric material reinforced with reinforcing fibers wherein the hinge and bias means comprise a hinge portion of the flap member having resilient position memory.

In a still further embodiment, the valve flap member distal and proximal portions and hinge comprise a fuel impervious one piece flexible elastomeric sheet member for sealing engagement with the plate circumferential region, a one piece flexible composite member comprising reinforcing fibers impregnated with a fuel impervious elastomeric material overlying the sheet member and a relatively rigid member fixed to and between the sheet member and the composite member for overlying the opening and the circumferential region.

A further embodiment includes a rigid member fastened to the valve flap member and has a peripheral portion overlying the circumferential region in the valve closed position.

In a still further embodiment, the rigid member comprises a material selected from the group consisting of aluminum, steel, epoxied glass fibers, epoxied carbon fibers and epoxied nylon fibers.

In a further embodiment, the distal portion is normally inclined relative to the proximal portion in a free standing state independently of the attachment to the base plate so that the intersection between the proximal and distal portions provides enhanced biasing toward the closed valve state when the flap member is in the open valve state.

A fuel container vent device according to the present invention comprises a plate for attachment to the container and having a vent opening including a female valve seat. A tubular member has a vent gas receiving opening, the member defining an axis and axially depending from the plate about the vent opening with an axially extending hollow core in communication with the vent opening. A male valve member is slidably engaged with the tubular member in the core and has an annular male valve seat for engaging the female valve seat in a vent closed position, the male member being axially displaceable from the closed position to an open position, the male member including a cylindrical weight portion for providing a predetermined weight value to the valve member. Bias means are secured to the tubular member and continuously engaged with the male valve member in the core for biasing the male valve member in a direction toward the closed valve position, the male member weight value and the bias value cooperating such that the vent opening is normally open when the axis is vertical, the bias means bias value and weight value having a value such as to cause the bias means to displace the male member to the closed valve state when the axis is rotated to at least about horizontal.

IN THE DRAWING:

FIG. 1 is a perspective view of a fuel cell including a valve and vent assembly according to an embodiment of the present invention;

FIG. 2 is a schematic diagrammatic side elevation sectional view of the fuel cell of FIG. 1;

FIG. 3 is a side sectional exploded view of the fill valve portion of the assembly of FIGS. 1 and 2 in a valve open state with no fuel shown for simplicity of illustration;

FIG. 4 is a view similar to that of FIG. 3 with the valve closed;

FIG. 5 is a side sectional elevation view of a fiber reinforced elastomer impregnated biasing flap element of the fill valve flap member in the free state independently of the valve assembly of FIGS. 3 and 4.

FIG. 6 is a sectional side elevation view of the fill valve assembly with an alternative embodiment for the fill valve flap member and of the vent valve according to the present invention;

FIG. 6a is a side sectional fragmented view of a portion of the valve flap member of FIG. 6 according to a further embodiment;

FIG. 7 is a bottom plan view of the valve of FIG. 4 taken along lines 7—7;

FIG. 8 is a sectional elevation view of a further embodiment; and

FIG. 8a is a sectional more detailed elevation view of the hinge portion of the FIG. 8 embodiment.

In FIGS. 1 and 2, a fuel cell 2 comprises an outer metal tank 4 having a tank body 6 and a lid 8 screwed to the body 6. A fuel fill valve and vent assembly 10 according to the present invention is mounted by screws and a gasket (not shown) to the tank 4. The assembly 10 comprises a fuel fill pipe and valve assembly 12 which is mounted on mounting plate 14. Secured to plate 14 is a tank breather vent assembly 16. A pair of fuel supply outlet fittings 18 are also mounted on mounting plate 14.

In FIG. 2, a flexible resilient elastomeric bladder 20 lines the interior of the tank 4. The bladder is of conventional design and is commercially available. The valve assembly 10 is mounted on and bolted to the bladder 20 in an opening in the lid 8 using screws, washers (not shown) and conventional nut-rings (not shown). The interior of the bladder 20 is filled with commercially available open cell foam 22. The dashed line 24 represents liquid fuel level in the tank 4. A fuel outlet line 26 is connected to fitting 18 in the bladder 20 interior. The lines 26 supply fuel to the fitting 18. Further lines (not shown) connected to the fittings 18 supply fuel to an engine (not shown).

In FIGS. 4 and 7, fuel fill pipe and valve assembly 12 comprises a circular sheet metal support plate 28 to which is preferably welded a fuel fill pipe 30. The plate 28 has a circular or oval fuel inlet opening 32 in which the pipe 30 is attached to plate 28. The opening 32 is offset eccentrically in the plate 28 as shown in FIG. 7. A resilient, flexible valve flap member 34 is secured clamped between support plate 28 and plate 14 by screws 36.

The flap member 34 comprises a movable flap 34' and a stationary fixedly secured peripheral portion 34". In this embodiment, the member 34 includes a flexible resilient elastomeric sheet member 38 and an overlying flexible relatively stiffer resilient composite sheet member 40. Member 40 comprises a woven reinforcing fiber layer impregnated with an elastomeric material. Sandwiched between the sheet members 38 and 40 in the movable flap 34' is a rigid sheet member 42. The member 42 is fabricated from a disc having a chordal section 43 removed and, therefore, is disc-like in configuration. The member 42 is larger at its periphery than the opening 32 in the support plate 28 and may be somewhat smaller in peripheral dimensions as the movable flap 34' formed by members 38 and 40. The member 42 is preferably bonded to the sheet members 38 and 40 with a suitable fuel impervious adhesive to form flap 34'.

The member 38 is preferably commercially available fuel impervious elastomeric material which is available under the trade mark Viton. Viton has a Shore durometer of about 60–70. It is preferably about 0.080 to 0.090 inches (2–2.3 mm) thick. The members 38 and 40 overlie the circular support plate 28, FIG. 7. The members 38 and 40 have a semicircular through slit 44 concentric with the center of plate 28 and subtending approximately an arc of about 270° forming the movable flap 34' of the flap member 34. The flap 34' is hinged at hinge 52 which is spaced distance 56 from the chordal portion of the disk-like rigid member 42.

Slit 44 terminates at a relatively smaller semicircular cutout 46 at opposite ends of the cut on opposite sides of the overlying members 38 and 40. The cutout 46 minimizes tearing of the material of members 38 and 40 at the termination point of the slit 44 at hinge 52. The slit 44 and hinge 52 overlie the plate 28 within and spaced slightly from the circular opening 48 in the mounting plate 14. The periphery of the members 38 and 40 overlie the circumferential adjacent peripheral region 50 of the plate 28 about fuel fill opening 32. A major portion of the members 38 and 40 overlies the plate 28 in the region between the opening 32 and the edge of the member 38 in a direction toward and including hinge 52.

By way of example, the opening 32 preferably may be about 2.25 inches (5.7 cm) in diameter. Screws 36 preferably may lie on a bolt circle of about 4.75 inches (12 cm). Plate 28 preferably may be about 0.19 inches (4.8 mm) thick metal, preferably aluminum, and plate 14 preferably may be about 0.25 inches (6.3 mm) thick metal, preferably aluminum.

Because the center of fuel fill opening 32 is offset from the center of the plate 14 opening 48 in approximately one quadrant of the plate 14 opening 48, flap 34' hinge 52 between the cutouts 46 is within the opening 48 but overlies the plate 28. This produces a spacing distance d between the hinge 52 and the fuel fill opening 32. This spacing d is important because it spaces the portion 54 of the flap 34' that covers the fuel fill opening distance d from the hinge 52. Distance d is sufficient for the flap 34' portion 54 to fully open as shown in FIG. 3. By way of example in this embodiment, distance d may be about 1.5 inches (3.8 cm).

The portion 56, FIG. 7, of the flap member 34 next adjacent to the hinge 52 overlying the plate 28 may not fully open and thus restrict fuel flow if over the opening 32 as in the prior art spider arrangement. This portion 56 is spaced from the opening over the offset portion of the plate 28 which receives no fuel flow. Thus the hinge area at hinge 52 of the flap 34 is displaced away from the fuel fill port a maximum displacement to allow maximum fill rate without compromising the sealing action. This provides the maximum fill rate and sealing advantages of both types "A" and "B" valves mentioned in the introductory portion without the disadvantages of either.

The sheet member 42 is rigid and preferably is slightly larger than the opening 32. The rigid member 42 serves to maintain the flap 34 in place in the presence of increased internal tank pressure. This increased pressure might occur in an accident where the fuel cell tank and bladder may be crushed. The rigid member 42 prevents the opening of the valve closed by the flap 34', FIG. 4.

The rigid member 42 may be fabricated from nylon fabric impregnated with fuel impervious elastomeric material. This rubberizes the member. The member 42 preferably may also comprise epoxied glass fibers, epoxied carbon fibers, or an epoxied synthetic high strength fiber known as Kevlar, a trademark of and available from the DuPont company. The member 42 may also be sheet aluminum, steel or other rigid materials, but preferably is as light as possible without sacrificing stiffness. The member 42 is preferably bonded to and between the flap members 38 and 40 to stiffen them by vulcanization or with a fuel impervious adhesive. The member 42 enhances the sealing action of member 38 by stiffening the flap 34' in a localized area under the sealing surface at plate 28 thus providing a wrinkle-free rubber or elastomeric seal zone. The rigid member 42 also serves to counter-balance the spring pressure of the flap 34' hinge 52 and to protect the flap 34' from inversion, that is, passing through the opening 32, due to over-pressure within the fuel cell tank. The combination of flexible and rigid components in the flap member 34 allow the valve to exhibit improved sealing action with increased tank pressure.

The outer flap member 40 is a composite of reinforcing fibers impregnated with an elastomeric fuel impervious material. The member 40 is stiffer than the elastomeric member 38, but is flexible and resilient. The flap member 40 is preferably nylon woven cloth impregnated with an elastomeric material. However, it could also be fabricated of other materials for the purpose described herein. Flap member 40 is relatively stiffer than the member 38 which has no reinforcing fibers.

In FIG. 5, the member 40 comprises a nylon fabric layer impregnated to form a sheet as described. A near right angle bend 60, e.g., preferably about 75°, but any value according to a given implementation, forms legs 58 and 62 in the member 40. The bend 60 is formed by distortion under pressure in the presence of heat to permanently form the bend 60. The bend 60 forms the hinge 52, FIG. 7, when the sheet material is flattened as shown in FIGS. 4 and 7 in the assembled condition. The interior angle a faces the member 38. The bend 60 provides memory to the member 40 legs 62 and 58 in that they inherently tend to return to the quiescent position of FIG. 5 from the flattened configuration of FIG. 4. This bend at hinge 52 may form a raised ridge as shown by hinge 120 in the embodiment of FIG. 8a, when the member 40 (member 116 in the figure) is abutted against the plate 28 in the closed position. Member 40 may be about 0.060 inches (1.5 mm) thick.

The inherent latent memory of the legs 58 and 62 to return to their original position provides enhanced resilient force to the flap 34' in a direction to close the valve from the open position of FIG. 3 to the position of FIG. 4. This latent energy increases the closing force of the member 38 on the valve seat providing enhanced sealing action. However, the closing force is sufficiently low such that fuel flow pressure against the flap 34' from pipe 30 automatically opens the flap member 34 to the full open state of FIG. 3. The flap 34' offers substantially negligible resistance to fuel flow opening immediately in response to such flow.

While the resiliency of the elastomeric member 38 contributes to the memory of the flap member 34 to return to the closing action, the stiffer member 40 enhances the rapidity of the closing action to ensure good sealing in the presence of adverse conditions in case of damage to the tank. The foam 22 is removed from the immediate vicinity of the flap 34' to permit its unimpeded opening during normal use. In case of damage where the bladder 20 (FIG. 2) is crushed, the foam is crushed against the flap 34' enhancing the sealing action. The woven fabric member 40 provides dimensional stability and anti-curl qualities to the rubber elastomeric member 38. Curling might otherwise occur due to aromatic gasolines, vibration and temperature fluctuations.

The elastomeric member 38 acts in conjunction with the stiffer member 40 to provide a spring action for the flap hinge 52 and also provides a gasketing seal between the plates 14 and 28.

The materials are made relatively lightweight to reduce inertia of the flap member 34. That is, by reducing the flap 34' weight, the inertia is minimized. This minimizes resistance of the flap 34' to close in response to its internal bias at hinge 52 in the absence of incident fuel thereon. This results in rapid closing of the valve. Incident fuel also opens the flap member 34 rapidly due to the flow force of the fuel on the flap 34' and the flap low inertia.

The inlet pipe 30 is offset on the support plate 28 to create leverage against the movable portion of the flap member 34 in response to the incoming flow of fuel. This rapidly opens the flap 34' faster and farther than prior valves providing improved fill rates. The flap 34' substrate material serves as its own spring via hinge 52. The reverse bend in the flap member at hinge 52 creates a spring pressure that holds the flap member 34 closed. This permits the flap to close rapidly at any attempt by the fuel to back-flow out of the fill pipe 30. The low inertia of the flap member 34 is such that only a minimum spring pressure is required to hold the flap member 34 closed. Also, less pressure is needed to open the valve during refueling or to close it in case of an accident.

A relatively lightweight rubberized fabric composite member 40 is combined with a relatively lightweight rigid carbon fiber composite, for example, member 42 to accomplish competing goals of maintaining low restriction, providing a fast acting flap mechanism and holding the flap 34' closed with a minimum spring pressure.

The rigid member 42 prevents the flap from being forced backward up the fill pipe 30 in case of high internal fuel cell tank pressures in the presence of an accident. The fold hinge 52 is recessed away from the fill pipe 30. This allows the incoming fuel to apply additional leverage against the flap member 34 for faster opening and a clearer opening area with reduced incoming flow restriction. The members 38, 40 and 42 are fuel resistant. The member 38 is also abrasion resistant and smooth to form a leak-tight contact against the fill support plate 28.

In FIG. 6, an alternative embodiment includes a valve assembly 64 wherein like reference numerals refer to identical parts in the embodiment of FIGS. 3, 4 and 7. Assembly 64 comprises a flap member 66 which is constructed differently than the flap member 34. In some applications of the valve assembly, a fuel may be used having additives which attack adhesives or vulcanization as employed in the prior described assemblies of FIGS. 3 and 4. In this case, the assembly 64 of FIG. 6 does not use vulcanization or adhesives.

In FIG. 6, flap member 66 comprises a composite flap 68 and a rigid disc-like member 70. The flap 68 may be constructed of similar materials as the flap member 40, FIG. 4. The member 70 preferably is a light weight metal or a composite as described above and includes an integral one piece construction with a boss 72. Boss 72 has a threaded bore 74. A screw 76 and washer 78, which may be non-metallic materials, secures the disc-like member 70 to the flap 68 through a bore in the flap 68. The operation of the flap 68 is the same as described above for flap 34'.

In FIG. 6a, in a further embodiment, flap 68 may be secured to a rigid disc-like member 80 which may be metal or composite materials as described in connection with member 42 above herein. The member 80 is secured to flap 68 by a screw 82 and nut 84. The flap 68 is otherwise constructed as described above herein for the flap member 40.

In FIG. 6, vent assembly 16 is secured to mounting plate 14. The vent assembly 16 may be used with the flap assembly embodiments of FIGS. 4 and 6. Vent assembly 16 comprises a preferably metal vent tube 82 attached upstanding to plate 16 at vent opening 84. An O-ring 86 is secured in the opening 84 in tube 82 to form a valve seat. A further preferably metal tube 88 depends from plate 14 at opening 84 forming a continuous conduit with the tube 82. The tube 88 has an array of four longitudinally extending slots 90 in the side thereof. The base of the tube widens into a radially outwardly flared portion 92. A ring collar 94 having an axially extending bore 96 is in the tube portion 92. A retaining ring 98 secures the collar to the tube 88.

A relatively weak coil compression spring 100 abuts the collar 94 and extends upwardly into the bore of the tube 88. A preferably stainless steel slug 102 is in the core 104 of tube 88. The slug 102 has a chamfered or conical valve surface forming a male valve 106. The valve 106 engages and mates with the O-ring 86 to form a fluid seal therebetween. The tube 88 in use depends into the bladder 20 interior volume, FIG. 2. The O-ring 86 therefore is fuel impervious. The slug 102 has an end cap portion 106' forming the male vale 106.

A preferably circular, cylindrical shank 108 depends from the portion 106' forming a shoulder 110. The spring 100 abuts the shoulder 110. The shank 108 has a diameter that is received in the bore 96 of collar 94 for guiding the slug at the bottom of the tube 88 core 104.

In the alternative, the shank 108 may have a reduced diameter forming further shoulder therein (not shown) such that the shank 108 has a lowermost region smaller in diameter than the region receiving the spring 100, the smaller diameter region is received in the bore 96 of the collar 94.

In operation, when the plate 14 is horizontal and the tube 88 axis 112 is vertical, the weight of the slug 102 overcomes the spring load of spring 100 so that the slug 102 shank 108 is in the collar bore 96. In case of rollover of a vehicle containing the assembly 16, the spring load of spring 100 is sufficiently great and the friction resistance between the slug 102 and the tube 88 is sufficiently low such that the slug is rapidly displaced toward plate 14. The displacement force is such that the valve 106 is immediately forced into engagement with the O-ring 86. There is no need for the vent assembly to be completely inverted for the sealing action to occur as with prior art ball check valves. The closing of this vent valve is relatively rapid and occurs before any foam can be forced into the tube 88 to stop the sealing action.

The slug 102 can be made any desired weight by fabricating the length of the shank 108 accordingly. The spring 100 force is also selected to cooperate with the slug weight so that the valve is closed quickly in case of rollover. Total inversion of the valve assembly is not necessary to activate the sealing action.

The fill and vent valve assemblies cooperate because of synergy between the fill and vent mechanisms. Rapid fuel filling requires an unobstructed inlet tube together with a fully open vent port for vapor discharge. The disclosed combination of vent and fuel fill valves assemblies provide instant action, unthrottled venting and fuel filling as well as full an simultaneous closure during a racing accident.

In FIG. 8, an alternative embodiment is shown wherein identical reference numerals refer to previous described elements of the same numerals. In FIG. 8, flap member 114 comprises a flexible resilient fiber reinforced sheet flap 116. Member 114 is constructed similarly as member 40, FIGS. 3 and 4. Bonded to flap 116 is rigid member 118. Member 118 is a composite material similar in construction as member 42, FIGS. 3 and 4. The flap member 114 may have peripheral dimensions similar to those of flap member 40, FIG. 7. Preferably, the rigid member 118 is formed of epoxied carbon fibers and the flexible resilient flap member 114 is formed of impregnated elastomeric material as described above with a tightly woven nylon cloth. The elastomeric filled member 116 serves as a good seal against the plate 28 in the closed position and as a gasket between the plates 14 and 28. The hinge 120, FIG. 8a, is reversely bent as described previously for member 40. In the quiescent stage of the valve closed position of FIG. 8a, the stiffness of the member 116 causes the preformed hinge 120, due to its reverse bend, to form a ridge as shown.

The combination of elements of flap member 114 provides a very light weight flap member with good resiliency and responsiveness to maintain the valve closed in the absence of incident fuel flow thereon. The rigid member 118 enhances the sealing action and overlies the plate 28 peripheral region about opening 32. This construction is low cost and comprises few elements simplifying manufacturing.

It will occur to those of ordinary skill that various modifications may be made to the disclosed embodiments without departing from the scope of the appended claims. Such modifications may include material compositions, dimensions and the nature of the action. For example, an integral one piece flap is illustrated having enhanced memory. In the alternative, a flap valve may be used comprising a separate torsion spring to hold the flap closed. The spring and flap are made of materials that can be safely used in a fuel tank environment such as high strength synthetic non-metallic materials.

There thus has been described a combined fuel fill valve assembly and vent valve assembly that provide enhanced sealing action while permitting rapid filling of fuel for a racing environment maximizing safety and minimizing fuel fill time.

What is claimed is:

1. A fuel fill valve for a liquid fuel container fill opening in a normally horizontal exterior wall thereof comprising:

a base plate for attachment to said fuel container exterior wall, said plate having opposing sides and an opening for passing received fuel therethrough and through said fill opening, said plate having a circumferential region surrounding said plate opening; and a resilient flexible fuel impervious valve flap member comprising a proximal portion fixedly attached in overlying relation to one side of said plate spaced from said opening and a distal movable portion overlying the opening and the plate circumferential region on the plate one side for resilient sealing engagement with the plate in a valve closed position in a flap member horizontal orientation, the distal and proximal portions being resiliently biased hinged to each other with sufficient resilient memory at a hinge region with the hinge region overlying the plate for resiliently biasing said distal portion to the closed horizontal position such that the distal portion displaces away from said opening and said plate region to a valve open position in response to the incidence of said received fuel thereon and returns to the closed position in the absence of said received fuel in response to said memory.

2. The valve of claim 1 wherein the distal and proximal portions comprise a one piece integral flap member of a fuel impervious flexible resilient elastomeric material reinforced with reinforcing fibers wherein the hinge and bias means comprise a flexible portion of said flap member having resilient position memory.

3. The valve of claim 2 wherein the fibers are selected from the group consisting of nylon, glass, polyester and carbon.

4. The valve of claim 2 wherein said flap member is formed with a bent portion wherein the distal portion is inclined at an angle to the proximal portion in a free standing state independent of attachment to said plate.

5. The valve of claim 1 wherein the valve flap member distal and proximal portions and hinge comprises a fuel impervious one piece flexible resilient elastomeric sheet member for sealing engagement with said plate circumferential region, a one piece resilient flexible composite sheet member comprising reinforcing fibers impregnated with a fuel impervious elastomeric material overlying the elastomeric sheet member and a rigid member fixed to and between the elastomeric sheet member and the composite member.

6. The valve of claim 5 wherein said rigid member comprises a material selected from the group consisting of aluminum, steel, epoxied glass fibers, epoxied carbon fibers and epoxied nylon fibers.

7. The valve of claim 1 further including a rigid sheet member fastened to said valve flap member and having a peripheral portion overlying said circumferential region in the valve closed position.

8. The valve of claim 1 wherein the distal and proximal portions comprise an integral flexible resilient one piece construction forming a flexible resilient hinge therebetween wherein the distal and proximal portions lie in different planes in the free standing state independently of the plate.

9. The valve of claim 1 wherein the valve flap member comprises a sheet member having a semi-annular through cut forming said distal portion and a peripheral portion surrounding the distal portion, the interface between said proximal and distal portions forming a hinge, further including a further plate overlying said peripheral portion and overlying said proximal portion radially outwardly said hinge for clamping the valve flap member peripheral portion to the base plate.

10. The valve of claim 1 wherein the flap member comprises reinforcing fibers impregnated with an elastomeric material.

11. The valve of claim 10 further including a reinforcing relatively rigid sheet member secured to said flap member.

12. The valve of claim 11 wherein the rigid sheet member comprises a composite material formed of reinforcing fibers and epoxy.

13. The valve of claim 11 wherein the fibers are carbon.

14. The valve of claim 11 wherein the rigid sheet member comprises material exhibiting negligible inertia for minimizing resistance of the flap member to close upon removal of said incident fuel.

15. A valve for a liquid fuel container fuel fill opening in a horizontal exterior wall thereof, said valve comprising:

a base plate for attachment to said fuel container exterior wall, said plate having opposing sides and an opening for passing received fuel therethrough and through said fuel fill opening, said plate having a circumferential region surrounding said plate opening; and a resilient flexible fuel impervious flap member comprising a proximal portion fixedly attached in overlying relation to one side of said plate spaced from said opening and a distal movable portion connected to the proximal portion and overlying the opening and the plate circumferential region on said plate one plate side for movable sealing engagement with the plate in a valve closed position in a horizontal orientation of the flap member, said flap member forming a hinge between said distal and proximal portions, said hinge overlying the plate spaced from the opening such that the distal portion displaces away from said opening and from said plate region to an open valve position in response to said received fuel;

said flap member having sufficient resilient position memory for biasing the open flap member to the closed horizontal position in the absence of said received fuel.

16. The valve of claim 15 wherein said distal portion is normally inclined relative to the proximal portion in a free standing state independently of said attachment to said plate so that the intersection between the proximal and distal portions provides enhanced biasing toward the closed valve state when the flap member is in the open valve state.

17. A valve assembly for a liquid fuel container comprising:

a base plate having opposing sides and an opening for passing received fuel therethrough, said plate having a circumferential region surrounding said opening and for attachment to a normally horizontal wall of said container;

a resilient flexible fuel impervious valve flap member comprising a proximal portion fixedly attached in overlying relation to one side of said base plate spaced from said opening and a movable distal portion overlying the opening and the plate circumferential region on the one plate side for resilient sealing engagement with the plate in a valve closed position in a normally horizontal orientation of said flap member, said distal and proximal portions being resiliently hingedly coupled, said distal portion being biased in the closed position in said horizontal orientation by resilient position memory of the flap member such that the distal portion displaces away from said opening and said plate region in response to said received fuel and for closing the valve in the absence of said received fuel;

a container mounting plate for attachment to the container and having a vent opening including a female valve seat, said mounting plate having a further opening, said base plate being attached to the mounting plate with said proximal portion between the mounting and base plates, said valve flap member being located in said further opening;

a tubular member having a vent gas receiving opening, said tubular member defining an axis, said tubular member axially depending from the mounting plate about said vent opening with an axially extending hollow core in communication with said vent opening;

a male valve member slidably engaged with the tubular member in said core and having an annular male valve seat for engaging said female valve seat in a vent closed position, said male member being axially displaceable from said closed position to an open position, said male member including a cylindrical weight portion for providing a predetermined weight value to said valve member; and second bias means secured to the tubular member and continuously engaged with the male valve member in the core for biasing the male valve member in a direction toward the closed valve position, the male member weight value and the bias value cooperating such that the vent opening is normally open when the axis is vertical, the second bias means bias value and weight value being such that the male member displaces to the closed valve state when the axis is rotated to at least about horizontal.

18. The valve assembly of claim 17 wherein the distal and proximal portions comprise a one piece integral flexible resilient flap member of a fuel impervious elastomeric material reinforced with reinforcing fibers forming a hinge therebetween and wherein the hinge forms a first bias means so that said flap member has said position memory in the closed valve position.

19. The valve of claim 18 wherein the valve flap member distal and proximal portions comprises a fuel impervious one piece flexible resilient elastomeric sheet member for sealing engagement with said plate circumferential region, a one piece flexible resilient composite member comprising reinforcing fibers impregnated with a fuel impervious elastomeric material overlying the sheet member and a rigid disc fixed to and between the sheet member and the composite member for overlying said opening and said circumferential region.

20. The valve of claim 18 further including a rigid disc fastened to said valve flap member and having a peripheral portion overlying said circumferential region in the valve closed position.

21. A fuel fill valve for a liquid fuel container fill opening comprising:

a base plate for attachment to said fuel container, said plate having opposing sides and an opening for passing received fuel therethrough, said plate having a circumferential region surrounding said opening; and a resilient flexible fuel impervious valve flap member comprising a proximal portion fixedly attached in overlying relation to one side of said plate spaced from said opening and a distal movable portion overlying the opening and the plate circumferential region on one plate side for resilient sealing engagement with the plate in a valve closed position, the distal and proximal portions being resiliently biased hinged to each other at a hinge region with the hinge region overlying the plate for resiliently biasing said distal portion to the closed position such that the distal portion displaces away from said opening and said plate region to a valve open position in response to the incidence of said received fuel thereon;

the distal and proximal portions comprising an integral flexible resilient one piece construction forming a flexible resilient hinge therebetween wherein the distal and proximal portions lie in different planes in the free standing state independently of the plate.

22. A fuel fill valve for a liquid fuel container fill opening comprising:

- a base plate for attachment to said fuel container, said plate having opposing sides and an opening for passing received fuel therethrough, said plate having a circumferential region surrounding said opening; and
- a resilient flexible fuel impervious valve flap member comprising a proximal portion fixedly attached in overlying relation to one side of said plate spaced from said opening and a distal movable portion overlying the opening and the plate circumferential region on one plate side for resilient sealing engagement with the plate in a valve closed position, the distal and proximal portions being resiliently biased hinged to each other at a hinge region with the hinge region overlying the plate for resiliently biasing said distal portion to the closed position such that the distal portion displaces away from said opening and said plate region to a valve open position in response to the incidence of said received fuel thereon;
- the distal and proximal portions comprising a one piece integral flap member of a fuel impervious flexible resilient elastomeric material reinforced with reinforcing fibers wherein the hinge and bias means comprise a flexible portion of said flap member having resilient position memory;
- said flap member being formed with a bent portion wherein the distal portion is inclined at an angle to the proximal portion in a free standing state independent of attachment to said plate.

23. A valve for a liquid fuel container comprising:

- a base plate for attachment to said fuel container, said plate having opposing sides and an opening for passing received fuel therethrough, said plate having a circumferential region surrounding said opening; and
- a resilient flexible fuel impervious flap member comprising a proximal portion fixedly attached in overlying relation to one side of said plate spaced from said opening and a distal movable portion connected to the proximal portion and overlying the opening and the plate circumferential region on said plate one plate side for movable sealing engagement with the plate in a valve closed position, said flap member forming a hinge between said distal and proximal portions, said hinge overlying the plate spaced from the opening such that the distal portion displaces away from said opening and from said plate region to an open valve position in response to said received fuel;
- said flap member having resilient position memory for biasing the open flap member to the closed position;
- said distal portion being normally inclined relative to the proximal portion in a free standing state independently of said attachment to said plate so that the intersection between the proximal and distal portions provides enhanced biasing toward the closed valve state when the flap member is in the open valve state.

* * * * *